United States Patent
Kyung et al.

(10) Patent No.: US 7,532,887 B2
(45) Date of Patent: May 12, 2009

(54) METHOD OF EXECUTING HANDOFF OF MOBILE TERMINAL IN MOBILE COMMUNICATIONS SYSTEM

(75) Inventors: Chan-Ho Kyung, Anyang (KR); Young-Jun Kim, Anyang (KR); Jong-Hoe An, Seoul (KR)

(73) Assignee: LG Electronics, Inc., Seoul (KR)

( * ) Notice: Subject to any disclaimer, the term of this patent is extended or adjusted under 35 U.S.C. 154(b) by 461 days.

(21) Appl. No.: 11/347,478

(22) Filed: Feb. 3, 2006

(65) Prior Publication Data

US 2006/0215609 A1  Sep. 28, 2006

(30) Foreign Application Priority Data

| Feb. 5, 2005 | (KR) | ........... 10-2005-0011023 |
| Feb. 17, 2005 | (KR) | ........... 10-2005-0013300 |
| Jul. 12, 2005 | (KR) | ........... 10-2005-0062826 |

(51) Int. Cl.
*H04Q 7/20* (2006.01)

(52) U.S. Cl. ............ 455/439; 455/438; 455/436; 370/331; 370/328

(58) Field of Classification Search .......... 455/439, 455/438, 436; 370/331, 328
See application file for complete search history.

(56) References Cited

U.S. PATENT DOCUMENTS

| 5,640,414 | A | * | 6/1997 | Blakeney et al. ............ 375/130 |
| 5,920,549 | A | * | 7/1999 | Bruckert et al. ............ 370/331 |
| 5,987,012 | A | * | 11/1999 | Bruckert et al. ............ 370/331 |
| 6,195,551 | B1 | * | 2/2001 | Kim et al. .................. 455/436 |
| 6,400,952 | B2 | | 6/2002 | Kim et al. |
| 2001/0016493 | A1 | | 8/2001 | Kim |
| 2004/0121774 | A1 | * | 6/2004 | Rajkotia et al. ............ 455/441 |
| 2004/0242199 | A1 | * | 12/2004 | Edlund et al. ............... 455/411 |

FOREIGN PATENT DOCUMENTS

| EP | 1 326 462 A | 7/2003 |
| EP | 1 467 586 A | 10/2004 |
| KR | 2004-41406 A | 5/2004 |

\* cited by examiner

*Primary Examiner*—Danh C Le
(74) *Attorney, Agent, or Firm*—Lee, Hong, Degerman, Kang & Waimey (57) ABSTRACT

For a mobile communications system, a method of allowing a mobile station in idle state to perform handoffs in a more efficient manner is provided. This is achieved by receiving, from a source base station via a first channel, channel information of a second channel that is a different type of channel than the first channel, the second channel being used for transmitting overhead messages by at least one neighboring base station; determining a target base station among the one or more neighboring base stations; and receiving the second channel from the target base station by using the channel information.

19 Claims, 4 Drawing Sheets

Source Base Station (Paging channel) → Idle state handoff → Target Base Station (P-BCCH)

FIG. 3B

MS idle state → Receiving P-BCCH channel information of the target base station via overhead messages → MS idle state

METHOD OF EXECUTING HANDOFF OF MOBILE TERMINAL IN MOBILE COMMUNICATIONS SYSTEM

CROSS REFERENCE TO RELATED APPLICATION

Pursuant to 35 U.S.C. § 119(a), this application claims the benefit of earlier filing date and right of priority to Korea Application No. 10-2005-11023, filed Feb. 5, 2005, Korean Application No. 10-2005-13300, filed Feb. 12, 2005 and Korean Application No. 10-2005-62826, filed on Jul. 17, 2005, the contents of which are hereby incorporated by reference herein in their entirety.

FIELD OF THE INVENTION

The present invention relates to mobile communication systems, and more particularly, to a method for an idle state mobile station of a mobile communications system to perform and support handoffs more efficiently.

BACKGROUND ART

Figure 1:
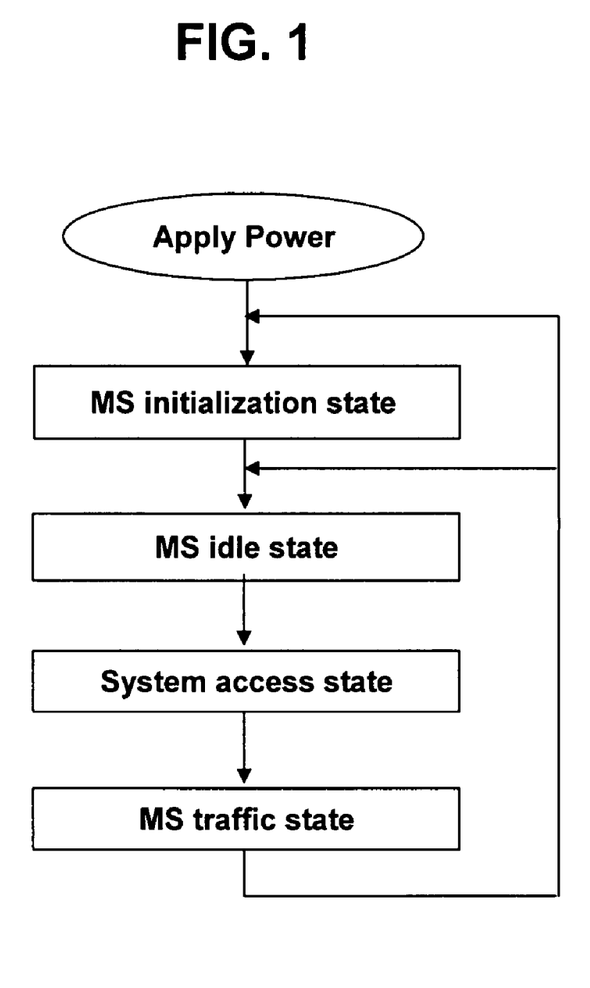
FIG. 1 shows an example of an overall call processing procedure beginning from power turn on of a mobile station in a mobile communication system.

FIG. 1 shows an example of an overall call processing procedure beginning from power turn on of a mobile station in a mobile communication system. When power is applied to the mobile station, necessary system information is read from memory and set in a RAM (or other storage means), synchronization with the system is performed by using a pilot channel and a sync channel, and a mobile station initialization state for receiving required system information is entered. In a message (e.g., a sync channel message) that is transmitted through the sync channel, system information, and frequency information related to a paging channel or a P-BCCH (Primary Broadcast Control CHannel) to allow a mobile station in idle state to decode the paging channel or the P-BCCH, and data rate or coding rate information are included. If the P-BCCH is employed, transmit diversity related information is additionally included.

The mobile station idle state refers to a state when, after the mobile station in initialization state received all system information and normal operations are complete, overhead messages have been received from a base station through the paging channel or the P-BCCH by using the information transmitted via the sync channel message. Some examples of these overhead messages are a system parameters message (SPM) that contains system related information, an extended system parameters message (ESPM), a general neighbor list message (GNLM) that contains information about neighbor cells or sectors, an extended neighbor list message (ENLM), a universal neighbor list message (UNLM), and the like.

The system access state refers to a state for allowing the mobile station to access the system, while the traffic state refers to when the mobile station is performing communications, i.e., a call is being performed. When a mobile station in system access state completes a particular operation, it returns to the idle state or traffic state. While in idle state, if a message transmitted through the paging channel or the P-BCCH is not received, the initialization procedure is started again. For a mobile station in traffic state, if a call ends while being performed, the initialization procedure is started again to re-establish sync.

The mobile station not only measures the pilot signal strength of a serving base station, but also obtains information, such as PILOT_PN and the like, with respect to neighbor cells, through neighbor messages such as GNLM, ENLM, UNLM, etc., and continuously monitors the pilot signal strengths of the neighbor cells. As a result of such monitoring, if the pilot signal strength of a neighbor cell increases above a certain threshold when compared to the pilot signal strength of the serving base station, the mobile station performs idle handoff, which refers to receiving a paging channel or P-BCCH from a base station having greater pilot signal strength.

Hereafter, the base station that the mobile station moves to upon performing idle handoff is called a target base station, while the current base station is called a source base station.

Figure 2A:
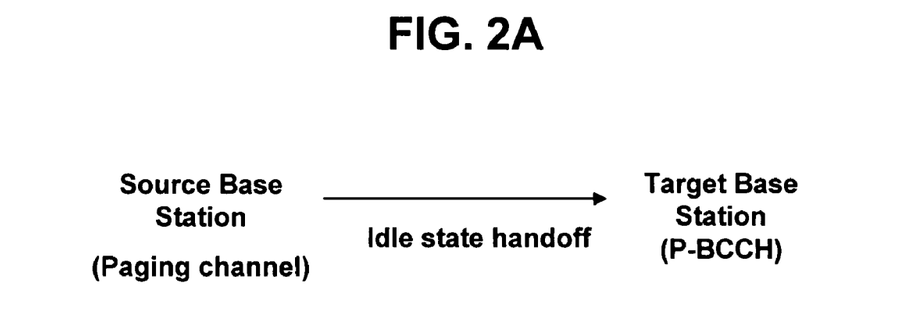
FIGS. 2a and 2b show an idle handoff performing procedure according to the related art.
Figure 2B:
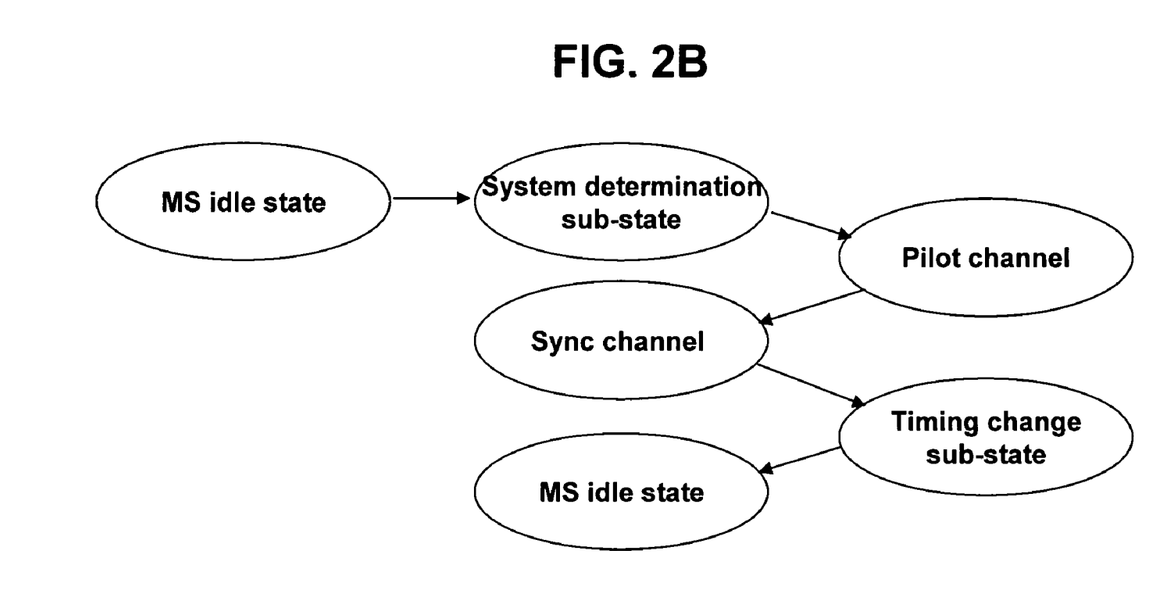

In the situation where a mobile station that had received a paging channel, moves to a target base station and must receive a P-BCCH, the related art suffers from problems because the mobile station does not receive from the source base station any information needed for decoding the P-BCCH. In more detail, as shown in FIGS. 2a and 2b, during idle state handoff, the idle state does not directly change over to idle state, but the mobile station moves to the target base station and after entering a system determination sub-state, the pilot channel and sync channel are received, information regarding the P-BCCH is received therefrom, and thereafter, idle state is entered. This causes the problem of creating delays.

Additionally, in the situation where a paging channel had been received from the source base station and a paging channel is to be received upon moving to the target base station, if the data rate changes upon moving to the target base station due to handover (e.g., changing from 4800 bps to 9600 bps), because the related art mobile station should go into the system determination sub-state and then enter the idle state, the problems of delay may occur. Similar problems occur when the related art mobile station that had received a P-BCCH from the source base station, needs to receive a paging channel after performing handover to the target base station.

Similarly, in the situation where a P-BCCH was received from the source base station and a P-BCCH is to be received from the target base station, if the data rate or coding rate or Walsh code changes at the target base station, the related art mobile station should go into the system determination sub-state and then enter the idle state, thus causing problems of delay.

If such delays occur during idle state handoff, if the related art mobile station had been receiving a broadcast service from the source base station while in idle state, these delays can greatly affect the broadcast service quality (QoS). In other words, as the related art mobile station in idle state receives a broadcast service through a forward supplement channel (F-SCH), the broadcast service cannot be received during the time consumed by the delay in entering the idle state by going through the system determination sub-state upon performing idle handoff.

SUMMARY

One aspect of the present invention involves the recognition by the present inventors of the drawbacks in the related art, as explained above. Based upon such recognition, improvements to idle state handoff procedures can be achieved according to the present invention.

The present invention has been developed to solve the above-described problems of the related art. One desirable result of the present invention is to minimize unnecessary delays that may occur when an idle state mobile station of a mobile communications system performs handoff, and to thus minimize quality degradation of a particular service being received from a source base station.

The present invention provides a method of supporting idle state handoffs of a mobile station performed by a base station of a mobile communications system. The present invention provides a method of performing handoff of a an idle state mobile station of a mobile communications system that can continue to receive a broadcast or multicast service before and after idle state handoff is performed.

More specifically, the present invention determines whether configuration information of the target base station exists in previously stored configuration information received from the neighboring base station, and performs idle handoff using the stored configuration information of the target base station if the configuration information is determined to exist, or returns to a system determination sub-state if the configuration information is determined not to exist.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION

The present invention is described as being implemented in a 3GPP2 type mobile communications system. However, the features of the present invention may also be adapted and implemented in communications systems operating under other types of communication specifications (e.g., 3GPP, 4G, IEEE, OMA, etc.), because the concepts and teachings of the present invention could be applied to various communication schemes that operate in a similar manner based upon common techniques.

Also, the present invention will be explained in the context of broadcast/multicast services (BCMCS), but the features of the present invention may apply to various types of point-to-multipoint services that provide multimedia data to users, such as multimedia broadcast/multicast service (MBMS), media broadcasting, contents delivery, and the like.

Non-limiting exemplary embodiments of the present invention are explained below with reference to the attached Figures.

For a mobile communications system, the present invention provides a method by which when an idle state mobile station performs handoff between a source base station and a target base station, unnecessary delays are minimized such that quality degradation of a service received from the target base station is minimized.

Figure 3A:
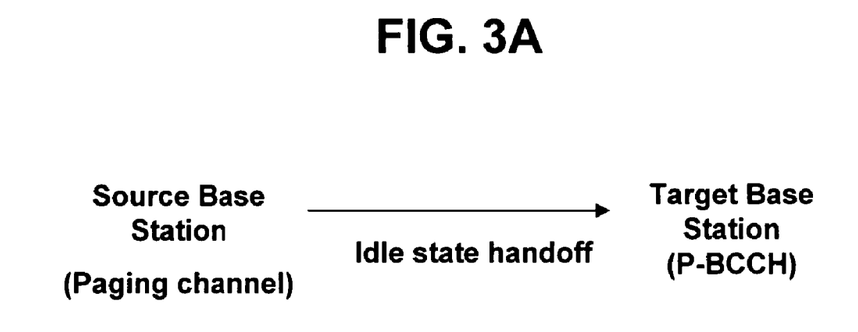
FIGS. 3a and 3b show an idle handoff performing procedure according to the present invention.
Figure 3B:
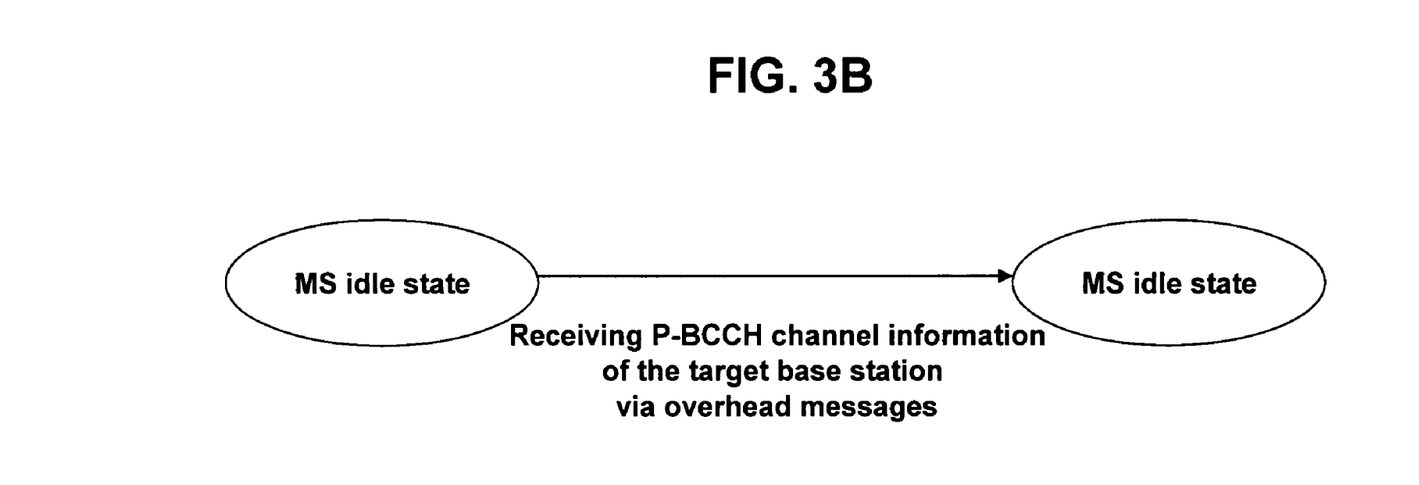

FIGS. 3a and 3b explain the features of some embodiments of the present invention. In the situation where neighbor base station information is transmitted from the source base station to the mobile station through a paging channel using overhead messages (such as GNLM, ENLM, UNLM, etc.), if such neighbor base station is a base station that transmits overhead messages through a P-BCCH (or other equivalent or similar control channel), in order to support idle state handoff, channel information of the P-BCCH for the target base station is received ahead of time from the source base station via the overhead messages. After handoff is completed, such channel information is used in receiving the P-BCCH of the target base station to allow reception of overhead messages with minimal delays.

Figure 4:
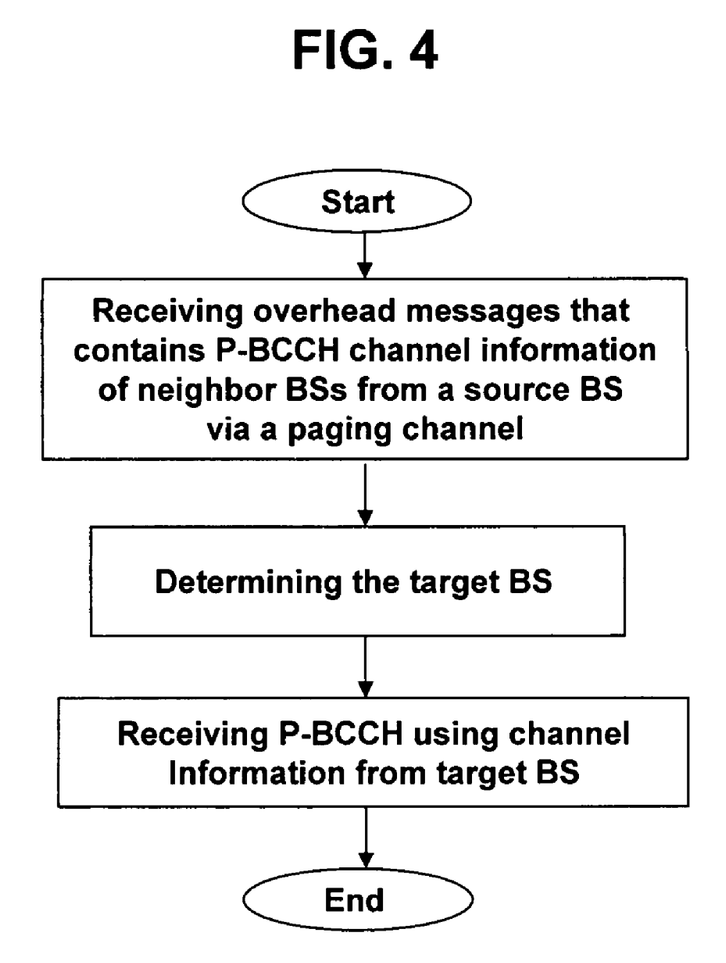
FIG. 4 shows a procedural flow of an exemplary embodiment of the present invention.

FIG. 4 shows a procedural flow of an exemplary embodiment of the present invention. A mobile station in idle state receives, from the source base station via a paging channel, an overhead message containing channel information of a P-BCCH of at least more than one neighbor base stations (S41).

The source base station may receive such channel information from a base station controller (BSC) or some other network entity with similar functions. Some examples of these overhead messages are a general neighbor list message (GNLM), an extended neighbor list message (ENLM), a universal neighbor list message (UNLM), BCMC service parameters message (BSPM), and the like. Here, it can be understood that other types of messages that have the same or similar functions may also be used.

The BSPM message is a message that is broadcast for mobile stations that desire to receive a broadcasting service, and includes control information for receiving broadcast service data. It should be noted that if the BSPM is not received, the mobile station may enter the system determination sub-state before going into the idle state in order to obtain the necessary broadcast/multicast service parameters.

The channel information refers to information for decoding the P-BCCH, and may include information related to the P-BCCH usage frequency, coding rate, data rate, and transmit diversity of the P-BCCH. Table 1 shows an example of a data format of the channel information of the P-BCCH included in the overhead message. The channel information may include all or some of the contents described in Table 1.

TABLE 1

| Field | Size (bits) |
| --- | --- |
| BCMC_SR1_BCCH_NON_TD_INCL | 1 |
| BCMC_SR1_NON_TD_FREQ_INCL | 0 or 11 |
| BCMC_SR1_CDMA_FREQ_NON_TD | 0 or 11 |
| BCMC_SR1_BRAT_NON_TD | 0 or 2 |
| BCMC_SR1_CRAT_NON_TD | 0 or 1 |
| BCMC_SR1_BCCH_CODE_CHAN_NON_TD | 0 or 6 |
| BCMC_SR1_TD_INCL | 1 |
| BCMC_SR1_CDMA_FREQ_TD | 0 or 11 |
| BCMC_SR1_BRAT_TD | 0 or 2 |
| BCMC_SR1_CRAT_TD | 0 or 1 |
| BCMC_SR1_BCCH_CODE_CHAN_TD | 0 or 6 |
| BCMC_SR1_TD_MODE | 0 or 2 |
| BCMC_SR1_TD_POWER_MODE | 0 or 2 |
| BCMC_SR3_INCL | 1 |
| BCMC_SR3_CENTER_FREQ_INCL | 0 or 1 |
| BCMC_SR3_CENTER_FREQ | 0 or 11 |
| BCMC_SR3_BRAT | 0 or 2 |
| BCMC_SR3_BCCH_CODE_CHAN | 0 or 7 |
| BCMC_SR3_PRIMARY_PILOT | 0 or 2 |
| BCMC_SR3_PILOT_POWER1 | 0 or 3 |
| BCMC_SR3_PILOT_POWER2 | 0 or 3 |

Here, it can be understood by those skilled in the art that the particular names or labels of the fields listed in Table 1 above are merely exemplary. Additional and/or other equivalent or similar names or labels may also be used to denote the particular fields that may be employed in the present invention.

In the example of Table 1, for SR1 (Spreading Rate 1), information related to whether or not transmit diversity is used, frequency used for P-BCCH according to whether or not transmit diversity is used, coding rate, data rate are included therein. For SR3 (Spreading Rate 3), information related to frequency used for P-BCCH, coding rate, data rate are included therein.

Each field in Table 1 will be explained hereafter.

BCMC_SR1_BCCH_NON_TD_INCL is an indicator that indicates whether BCCH information is included for situations that are not TD (transmit diversity) mode in SR1.

BCMC_SR1_NON_TD_FREQ_INCL is an indicator that indicates whether frequency information of SR1 non-transmit-diversity is included.

BCMC_SR1_CDMA_FREQ_NON_TD is a field for SR1 non-transmit-diversity frequency allocation.

BCMC_SR1_BRAT_NON_TD is a BCCH data rate field in SR1 non-transmit-diversity mode.

BCMC_R1_CRAT_NON_TD is a BCCH code rate field in SR1 non-transmit-diversity mode.

BCMC_SR1_BCCH_CODE_CHAN_NON_TD is a Walsh code field for SR1 BCCH in non-transmit-diversity mode.

BCMC_SR1_TD_INCL is an indicator field including SR1 transmit diversity frequency information.

BCMC_SR1_CDMA_FREQ_TD is a SR1 frequency allocation field for transmit diversity operation.

BCMC_SR1_BRAT_TD is a BCCH data rate field in SR1 transmit diversity mode.

BCMC_SR1_CRAT_TD is a coding rate field in SR1 transmit diversity mode.

BCMC_SR1_BCCH_CODE_CHAN_TD is a SR1 BCCH Walsh code field in transmit diversity mode.

BCMC_SR1_TD_MODE is a SR1 transmit diversity mode field.

BCMC_SR1_TD_POWER_MODE a SR1 transmit diversity transmission power level field.

BCMC_SR3_INCL is an indicator field that indicates whether SR3 information is included.

BCMC_SR3_CENTER_FREQ_INCL is a filed that indicates center SR3 frequency allocation.

BCMC_SR3_CENTER_FREQ is a center SR3 frequency allocation field.

BCMC_SR3_BRAT is a SR3 BCCH data rate field.

BCMC_SR3_BCCH_CODE_CHAN is a SR3 BCCH Walsh code field.

BCMC_SR3_PRIMARY_PILOT is a first (primary) SR3 pilot field.

BCMC_SR3_PILOT_POWER1 is a first SR3 pilot power level field related to the lower frequency among the two residual SR3 frequencies.

BCMC_SR3_PILOT_POWER2 is a first SR3 pilot power level field related to the higher frequency among the two residual SR3 frequencies.

Table 2 shows an exemplary message when information related to the P-BCCH of neighbor base stations is informed by the source base station to the mobile station via the BSPM (BCMC Service Parameters Message). In Table 2, BCMC_NUM_NGHBR indicates the number of neighbor base stations to which P-BCCH related information is to be informed through the BSPM, while BCMC_NGHBR_PN includes PN offset information of each neighbor base station. The information related to the BCMC_NGHBR_PN and P-BCCH are included by as much as the number of neighbor base stations {BCMC_NUM_NGHBR}.

TABLE 2

| Field | Length (bits) |
| --- | --- |
| [ . . . ] | |
| BCMC_NUM_NGHBR | 6 |
| BCMC_NUM_NGHBR occurrences of the following variable length record { (BCMC_NUM_NGHBR) | |
| BCMC_NGHBR_PN | 9 |
| BCMC_SR1_BCCH_NON_TD_INCL | 1 |
| BCMC_SR1_NON_TD_FREQ_INCL | 0 or 1 |
| BCMC_SR1_CDMA_FREQ_NON_TD | 0 or 11 |
| BCMC_SR1_BRAT_NON_TD | 0 or 2 |
| BCMC_SR1_CRAT_NON_TD | 0 or 1 |
| BCMC_SR1_BCCH_CODE_CHAN_NON_TD | 0 or 6 |
| BCMC_SR1_TD_INCL | 1 |
| BCMC_SR1_CDMA_FREQ_TD | 0 or 11 |
| BCMC_SR1_BRAT_TD | 0 or 2 |
| BCMC_SR1_CRAT_TD | 0 or 1 |
| BCMC_SR1_BCCH_CODE_CHAN_TD | 0 or 6 |
| BCMC_SR1_TD_MODE | 0 or 2 |
| BCMC_SR1_TD_POWER_LEVEL | 0 or 2 |
| } (BCMC_NUM_NGHBR) | |

Here, it can be understood by those skilled in the art that the particular names or labels of the fields listed in Table 2 above are merely exemplary. Additional and/or other equivalent or similar names or labels may also be used to denote the particular fields that may be employed in the present invention.

As a method of transmitting such channel information by the source base station to the mobile station, transmission of all data related to such channel information could be possible, but another method may also be considered. Namely, matching of the channel information with bit information can be performed according to associations (combinations or sets) of channel information. Here, the number of bit information is previously determined between the source base station, the mobile station, and neighbor base stations. For example, to indicate the 'configuration' of neighbor base stations, the reserved values of the NGHBR_CONFIG (which is a 3-bit field that is transmitted through the GNLM as many times as the number of neighbor base stations) are used to perform matching of each association (combination or set) of the P-BCCH usage frequency, coding rate, and data rate (that are included in the channel information) to the bit information of 3 bits, to thereby transmit the bit information that has been matched with current channel information of the P-BCCH of neighbor base stations, to thus reduce the amount of load for transmitting channel information. Also, when the neighbor base stations transmit the P-BCCH at a particular usage frequency, coding rate, and data rate that were previously determined between the source base station and the mobile stations, the channel information can be transmitted by means of a simple procedure, such as setting the 1-bit 'indication' to '1' or the like.

The mobile station that received, from the source base station, the P-BCCH channel information of neighbor base stations, retains the received information upon storage in memory, and can later use such during subsequent handoffs.

If the received BCMC_SR1_BCCH_NON_TD_INCL has been set to '1', the mobile station stores in memory, the values of the BCMC_SR1_NON_TD_FREQ_INCL, BCMC_SR1_BRAT_NON_TD, BCMC_SR1_CRAT_NON_TD, and BCMC_SR1_BCCH_CODE_CHAN_NON_TD that were received from the base station, and if the received BCMC_SR1_NON_TD_FREQ_INCL has been set to '1', the BCMC_SR1_CDMA_FREQ_NON_TD that was received from the base station is stored.

If BCMC_SR1_TD_INCL has been set to '1', the BCMC_SR1_CDMA_FREQ_TD, BCMC_SR1_BRAT_TD, BCMC_SR1_CRAT_TD, BCMC_SR1_BCCH_CODE_CHAN_TD, BCMC_SR1_TD_MODE, and BCMC_SR1_TD_POWER_MODE, which were received from the base station are stored.

Also, if the BCMC_SR3_BRAT_TD received from the base station has been set to '1', the information of BCMC_SR3_CENTER_FREQ_INCL, BCMC_SR3_BRAT, BCMC_SR3_BCCH_CODE_CHAN, BCMC_SR3_PRIMARY_PILOT, BCMC_SR3_PILOT_POWER1, and BCMC_SR3_PILOT_POWER2 are stored, and if BCMC_SR3_CENTER_FREQ_INCL has been set to '1', the BCMC_SR3_CENTER_FREQ received from the base station is also stored.

The mobile station continuously monitors the pilot signal strength of neighbor base stations, and if the pilot signal strength of a neighbor base station increases to above a certain threshold value over the pilot signal strength of the source base station, a corresponding neighbor base station is determined to be the target base station and handoff is performed (S42).

Upon performing handoff, the mobile station uses the channel information that was retained upon receipt from the source base station, to receive with minimal delays, the P-BCCH that is transmitted by the target base station (S43). Accordingly, as the mobile station in idle station is receiving a different service (such as a broadcast service) through a F-SCH (Forward Supplemental Channel) from the source base station, even if idle handoff to a target base station is performed, because the idle state may be directly entered without any delays being created due to going through a system determination state before entering the idle state, the service that had been provided from the source base station may continue to be received from the target base station without service disconnection.

Upon performing idle state handoff by the mobile station, the operation procedures at the target base station will be explained in more detail as follows. When the mobile station performs initialization of the sequence number with respect to overhead messages to be received through the P-BCCH from the target base station, initially, the sequence number with respect to an overhead message related to an access channel or an enhanced access channel is initialized, a PILOT_PN$_s$ of the memory is received from the source base station for setting to the value of the BCMC_NGBHR_PN that was retained in storage. As a result of receiving an overhead message from the P-BCCH of the target base station, if the information of the overhead that was retained in storage is deemed to be most recent, the received information is used to perform hashing to a new F-CCCH, and paging and the like is received from the F-CCCH. As a result of receiving an overhead message, if the information of the overhead that was retained in storage is deemed to be not most recent, the mobile station performs initialization with respect to sequence numbers of related messages. The question of whether the overhead message is most recent or not can be determined by comparing the received sequence number of the corresponding message with a stored sequence number. After going through the above procedures, the mobile station compares to see if the NGBHR_FSCH_FREQ (i.e., corresponding frequency information of the FSCH that is a channel for receiving a broadcast service) that was received through the BSPM of the source base station and retained in memory, matches the CDMACH$_s$ of the target base station. If not a match, CDMACH$_s$ is set to NGHBR_FSCH_FREQ and upon performing tuning to a new CDMA channel, the broadcast from the FSCH is monitored.

Thus far, an embodiment where the mobile station has been receiving a paging channel from the source base station, then moves to the target base station to receive a P-BCCH, has been explained. As another embodiment, during the procedure where the mobile station that was receiving a P-BCCH from the source base station, moves to the target base station upon performing idle state handover and receives a P-BCCH, if the data rate, code rate, and/or Walsh code change, the features of the present invention can be applied.

If the above situation is explained in more detail, when a related art mobile station performs handover and has moved to a target base station, delays occur because the idle state must be entered by first entering a system determination state. But according to the present invention, the mobile station receives in advance from the source base station via P-BCCH overhead messages, the P-BCCH channel information (frequency, data rate, coding rate, Walsh code, etc.) of the target base station, such that the channel information is used after handoff is complete to receive the P-BCCH of the target base station to allow reception of overhead messages with minimal or no delays.

In another embodiment of the present invention, in case a paging channel was received from the source base station and a paging channel is again received after moving to the target base station, even if the data rate changes upon moving to the target base station due to handover (e.g., changes from 4800 bps to 9600 bps), the features of the present invention can be applied. In such case, the mobile station receives in advance from the source base station, paging channel information of neighbor base stations (e.g., GNLM, ENLM, UNLM, BSPM, etc.) via overhead messages, such that the channel information is used after handoff is complete to receive the P-BCCH of the target base station to allow reception of overhead messages without delay.

In a further embodiment of the present invention, in case a P-BCCH was received from the source base station but a paging channel is received after moving to the target base, even if there is a difference in the default data rate (e.g., 9600 bps) for transmitting the paging channel by the target base station upon moving to such target base station due to handover, the features of the present invention can be applied. In such case, the source base station transmits to the mobile station via overhead messages, paging channel information of the target base station (in particular, a current data rate) in order to prevent or minimize unnecessary delays in the handover procedure.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

The present invention provides a method of supporting handoff when a mobile station is in idle mode, the method comprising: receiving and storing configuration information of neighboring base stations; while checking a strength of pilot channels of the neighboring base stations, detecting a pilot signal strength of a target base station that is greater than that of a source base station; checking whether configuration information of the target base station exists among the stored configuration information of the neighboring base stations; and determining how to perform idle handoff based upon the checking.

The determining step comprises, if the configuration information does not exist, returning to a system determination sub-state. The determining step comprises, if the configuration information exists, performing idle handoff using the stored configuration information of the target base station.

The configuration information is received through overhead messages. The overhead messages comprises a Broadcast/Multicast Service Parameters Message (BSPM) and neighbor list messages. The neighbor list messages comprise at least one of a General Neighbor List Message (GNLM), an Extended Neighbor List Message (ENLM), and a Universal Neighbor List Message (UNLM).

The overhead messages include fields that indicate information of a physical channel, in which overhead messages are sent, used by the mobile station in idle state. The information of the physical channel indicates whether transmit diversity is supported or not. If transmit diversity is supported, appropriate values for parameters comprising frequency assignment, data rate, code rate, Walsh code, transmit diversity mode, and power level are used. If transmit diversity is not supported, appropriate values for parameters comprising frequency assignment, data rate, code rate, and Walsh code are used.

If the mobile station has monitored a PCH from before performing idle handoff, and has selected a neighbor base station for idle handoff which supports P-BCCH and the mobile station has received parameters for the P-BCCH of the neighbor base station from the BSPM, then the mobile station performs normal handoff procedures.

The source base station sends overhead messages via a first control channel for overhead messages, and the target base station sends overhead messages via a second control channel for overhead messages. The first and second control channels are broadcast control channels. The first control channel is a PCH and the second control channel is a P-BCCH.

The information includes at least one of a pilot PN sequence offset, and appropriate values for frequency assignment, data rate, code rate, and Walsh code. The information is provided in a quantity that matches the total number of neighbor base stations.

Also, the present invention provides a method of supporting handoff when a mobile station is in idle mode, the method comprising: detecting a pilot signal strength of a target base station that is greater than that of a source base station upon checking pilot channel strengths of multiple neighboring base stations; determining whether configuration information of the target base station exists in previously stored configuration information received from the neighboring base stations; and performing handoff using the stored configuration information of the target base station if the configuration information exists, or returning to a system determination sub-state if the configuration information fails to exist.

The configuration information is received via overhead messages comprising point-to-multipoint service parameters and a list of neighbor base stations. The overhead messages includes parameters for a physical channel that is used in sending the overhead messages, the parameters indicating whether transmit diversity is supported or not. If transmit diversity is supported, values for frequency assignment, data rate, code rate, Walsh code, transmit diversity mode, and power level are included in the overhead messages. If transmit diversity is not supported, values for frequency assignment, data rate, code rate, and Walsh code are included in the overhead messages.

The parameters for each neighbor base station are respectively provided, such that the total number of parameters match the total number of neighbor base stations.

As described thus far, those skilled in the art related to the field of the present invention would understand that various substitutions, modifications, and changes are possible within the technical scope of the present invention, without being limited to the exemplary embodiments and attached Figures described herein.

As for some desirable results and effects of the present invention, according to the handoff executing method for a mobile station in idle state in a mobile communications system, when an idle state mobile station performs handoff between a source base station and a target base station that respectively transmit overhead messages through different types of channels, unnecessary delays are prevented such that the quality of the service that was received from the source base station can be maintained without service quality degradation upon performing handoff. In particular, this results in reception of broadcast or multicast service without being disconnected before and after a mobile station in idle state performs handoff.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of supporting handoff when a mobile station is in idle mode, the method comprising:
   receiving and storing configuration information of neighboring base stations;
   detecting a pilot signal strength of a target base station that is greater than the target signal strength of a source base station, while checking a strength of pilot channels of the neighboring base stations;
   checking whether configuration information of the target base station exists among the stored configuration information of the neighboring base stations; and
   determining how to perform idle handoff based upon the checking,
   wherein the mobile station performs normal handoff procedures if the mobile station has monitored a paging channel (PCH) before performing idle handoff, has selected a neighbor base station for idle handoff which supports primary broadcast control channel (P-BCCH) and has received parameters for the P-BCCH of the neighbor base station via a broadcast/multicast service parameters message (BSPM).

2. The method of claim 1, further comprising:
   if the configuration information does not exist, entering a system determination sub-state.

3. The method of claim 1, wherein the determining step comprises:
   if the configuration information exists, performing idle handoff using the stored configuration information of the target base station.

4. The method of claim 2, wherein the configuration information is received through overhead messages.

5. The method of claim 4, wherein the overhead messages comprises a Broadcast/Multicast Service Parameters Message (BSPM) and neighbor list messages.

6. The method of claim 5, wherein the neighbor list messages comprise at least one of a General Neighbor List Message (GNLM), an Extended Neighbor List Message (ENLM), and a Universal Neighbor List Message (UNLM).

7. The method of claim 4, wherein the overhead messages include fields that indicate information of a physical channel, in which overhead messages are sent, used by the mobile station in idle state.

8. The method of claim 7, wherein the information of the physical channel indicates whether transmit diversity is supported or not.

9. The method of claim 8, wherein if transmit diversity is supported, appropriate values for parameters comprising frequency assignment, data rate, code rate, Walsh code, transmit diversity mode, and power level are used.

10. The method of claim 8, wherein if transmit diversity is not supported, appropriate values for parameters comprising frequency assignment, data rate, code rate, and Walsh code are used.

11. The method of claim 7, wherein the information includes at least one of a pilot PN sequence offset, and appropriate values for frequency assignment, data rate, code rate, and Walsh code.

12. The method of 11, wherein the information is provided in a quantity that matches the total number of neighbor base stations.

13. The method of claim 4, wherein the source base station sends overhead messages via a first control channel for overhead messages, and the target base station sends overhead messages via a second control channel for overhead messages.

14. The method of claim 13, wherein the first and second control channels are broadcast control channels.

15. The method of claim 14, wherein the first control channel is a PCH and the second control channel is a P-BCCH.

16. A method of supporting handoff when a mobile station is in idle mode, the method comprising:
    detecting a pilot signal strength of a target base station that is greater than that the pilot signal strength of a source base station upon checking pilot channel strengths of multiple neighboring base stations;
    determining whether configuration information of the target base station exists in previously stored configuration information received from the neighboring base stations; and
    performing handoff using the stored configuration information of the target base station if the configuration information exists, or returning to a system determination sub-state if the configuration information fails to exist, wherein the configuration information is received via overhead messages comprising point-to-multipoint service parameters and a list of neighbor base stations, wherein the overhead messages include parameters for a physical channel that is used in sending the overhead messages, the parameters indicating whether transmit diversity is supported or not.

17. The method of claim 16, wherein if transmit diversity is supported, values for frequency assignment, data rate, code rate, Walsh code, transmit diversity mode, and power level are included in the overhead messages.

18. The method of claim 16, wherein if transmit diversity is not supported, values for frequency assignment, data rate, code rate, and Walsh code are included in the overhead messages.

19. The method of 16, wherein the parameters for each neighbor base station are respectively provided, such that the total number of parameters match the total number of neighbor base stations.

* * * * *